UNITED STATES PATENT OFFICE 2,609,388

PREPARATION OF LOWER FATTY ACID ESTERS OF GERANIOL, NEROL, AND LINALOÖL

Robert L. Knapp and Dwight L. Schoene, Naugatuck, Conn., assignors to United States Rubber Company, New York, N. Y., a corporation of New Jersey No Drawing. Application January 5, 1950, Serial No. 137,038

6 Claims. (Cl. 260—489)

This invention is concerned with improvements in the preparation of valuable perfume materials, namely, the lower fatty acid esters of geraniol, nerol and linaloöl from myrcene. These esters are customarily obtained by the treatment of natural products and their quality and cost are quite variable, depending upon their source. Their odor also varies depending upon their source, it being difficult to remove odorous impurities by commercial distillation procedures. Our process enables the preparation of the substantially pure esters. Another feature of the process of our invention is that it provides a way of making these aromatic products from domestic raw materials, thus freeing perfumers from dependence upon costly imported products.

The principal object of our invention is to provide a simple and effective method of converting myrcene to lower fatty acid esters of geraniol, nerol and linaloöl. Another object is to provide such a method which yields the esters in substantially pure form. Other objects of the invention will be obvious to those skilled in the art in the light of this description.

We have now discovered that lower fatty acid esters, particularly the acetic acid esters, of geraniol, nerol and linaloöl can be made from myrcene by reacting it with substantially anhydrous hydrogen chloride or bromide and then reacting the addition product so formed with an alkali metal salt of a lower fatty acid, such as an alkali metal acetate, whereby the addition product undergoes ester interchange, the fatty acid acyloxy group replacing the chlorine or bromine in what was originally the conjugated diene part of the myrcene molecule.

The process is carried out quite simply. In a typical embodiment, myrcene is treated with anhydrous hydrogen chloride or bromide, preferably at relatively low temperature, viz., from 0° C. to 50° C., until approximately one mol equivalent of the hydrogen halide (e. g., from 0.75–1.25 mol of hydrogen halide per mol of myrcene) has been taken up, i. e., combined. Myrcene is a substituted butadiene of the formula:

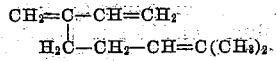

Myrcene (2-methyl-6-methylene-2,7-octadiene) offers three double bonds for possible reaction with the hydrogen halide. Actually, the conjugated diene system is the more reactive and most of the addition takes place at this point giving two possible products (where X is chlorine or bromine):

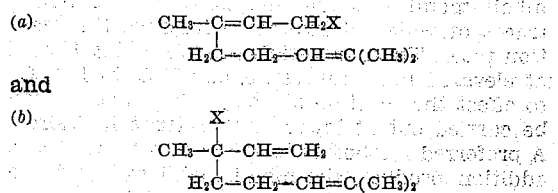

These are allylic isomers and exist in equilibrium with each other. Their relative proportions can be altered by known methods of effecting the allylic rearrangement (see for example, Young et al., J. A. C. S. 60, 847 (1938) and Kharasch et al., J. Org. Chem., 1, 393 (1936)). Thus, the proportion of linalyl halide can be varied by varying the reaction conditions. As previously indicated, the hydrogen halide adds preferentially at one of the double bonds in the conjugated portion of the myrcene, giving mainly geranyl, neryl and linalyl halides. Addition of the hydrogen halide at the isolated double bond (in the 2-position) in myrcene gives in that portion of the molecule a tertiary halide which dehydrohalogenates (regenerating the double bond in the 2-position) during the subsequent reaction with the alkali metal salt of the lower fatty acid to a much greater extent than it is converted to an ester grouping. For this reason it is of small moment if part of the addition does take place at this double bond. An excess of hydrogen halide can be added to the myrcene without altering the final product, since much of the excess is removed by dehydrohalogenation rather than by conversion to ester form. In some experiments, a small quantity of an acetate has been isolated which has a pineapple-like odor and slowly polymerizes on standing. This polymerization indicates that the product still has a conjugated double bond system with the acetoxy group on the other part of the molecule.

The hydrohalogenation of the myrcene may be carried out in a solvent, exemplified by chloroform or glacial acetic acid, but use of such a solvent is not essential.

The hydrohalogenation of the myrcene is carried out under substantially anhydrous conditions, i. e., using anhydrous or substantially anhydrous reactants and reaction medium and proceeding in such a manner that access of extraneous water is substantially prevented.

The hydrohalogenation of the myrcene is preferably so conducted that approximately one mol of HCl or HBr combines with each mol of myrcene. Preferably at least one mol of HCl or HBr is employed per mol of myrcene. As indicated above, the employment of a substantial molar excess of the hydrogen halide does no harm.

The most convenient method of effecting the hydrohalogenation of the myrcene comprises passing the hydrogen halide gas through a mixture of the myrcene and a suitable solvent confined in a suitable vessel until the desired weight increase, indicating chemical combination of the hydrogen halide, has taken place.

The product resulting from the addition reaction, with or without purification, as by fractional distillation, is now reacted with the alkali metal salt of the lower fatty acid to form the ester. This reaction may be carried out by using a lower fatty acid, especially concentrated or glacial acetic acid which is preferred because of its low cost and availability, as solvent for the alkali metal salt and the addition product. The alkali metal salt may be anhydrous although traces of water of hydration improve the reaction rate. These materials are preferably heated at elevated temperatures, e. g., 75° C. to 130° C., to effect the reaction although the reaction may be carried out at lower temperatures if desired. A preferred method is to reflux a mixture of the addition product, the alkali metal salt and the lower fatty acid solvent for several hours until the reaction has attained the desired degree of completion.

Alternatively, the addition product may be converted to the ester by heating with the alkali metal salt of the lower fatty acid in solid, finely divided form. A slurry of the salt in the addition product may be heated to a suitable elevated temperature, e. g., 75° C. to 130° C., until reaction is essentially complete. This usually will require several hours.

The reaction with the alkali metal salt is moderately exothermic. Some dehydrohalogenation occurs during the reaction, regenerating myrcene which can be recovered and recycled for use in subsequent preparations.

While the alkali metal acetates are most commonly employed in the practice of our invention, these giving the acetic acid esters, we are not limited thereto but may use alkali metal propionates, butyrates, etc., to give the corresponding propionate, butyrate, etc. esters. While we generally use the sodium salts, we may use the salts of other alkali metals such as potassium, lithium, etc.

The second reaction in our process may be pictured as follows:

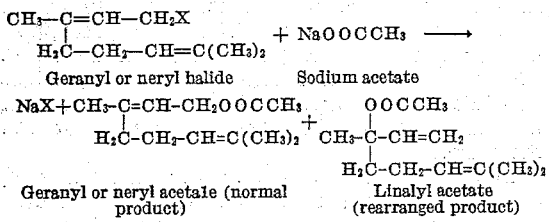

Geranyl or neryl halide   Sodium acetate

Geranyl or neryl acetate (normal product)   Linalyl acetate (rearranged product)

Similarly, linalyl halide,

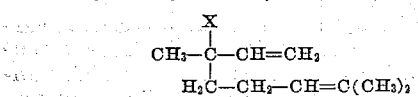

will give the same products on reaction with sodium acetate. As indicated previously, the proportions of rearranged product may be varied by varying the conditions under which the reaction is carried out.

The amount of the alkali metal salt employed should be at least molecularly equivalent to the amount of myrcene hydrohalide, so as to effect conversion of all of the geranyl, neryl, or linalyl halide to the corresponding ester.

Following reaction with the alkali metal salt to the desired extent, the hot reaction mixture may be quenched with water or with an aqueous sodium chloride solution, which is preferably dilute so that it can dissolve the salt (alkali metal chloride or bromide) formed as a precipitate during the reaction. This also constitutes a washing operation allowing water-soluble impurities such as alkali metal chloride or bromide, acetic acid, any excess hydrogen halide, etc. to be washed out into the aqueous layer while allowing the more desired oil to rise to the top and separate. The salt acts to increase the specific gravity of the aqueous solution. The ester product is recovered from the oily layer in any suitable manner and preferably is purified as by fractional distillation.

The following examples illustrate our invention in more detail. All parts are by weight.

*Example 1*

Fifty-six parts of myrcene (99% pure and containing 0.25% tertiary butyl catechol) in 152 parts of chloroform was treated with dry hydrogen bromide at 10–15° C. until a weight increase of 32 parts was obtained. The solvent was evaporated on a steam bath leaving 81 parts of a clear brown oil having a strong anise-like odor. The oil evolved hydrogen bromide on standing. Seventy-nine parts of this hydrobromide was added to a boiling solution of 100 parts anhydrous sodium acetate in 400 parts of glacial acetic acid. An exothermic reaction occurred and sodium bromide precipitated. After refluxing for 1 hour, the mixture was quenched in a dilute aqueous sodium chloride solution and the oil separated. The yield of crude product was 58 parts. The product was distilled at reduced pressure and separated into two main fractions. The first boiled up to 40° C./2 m. and had a refractive index of 1.4732/20° C. which indicated it to be myrcene. The second, totaling 16 parts, had a boiling point of 80–82° C./1–2 mm., refractive index of 1.4625/20° C., and the odor of geranyl acetate. These physical constants are close to those of the 90–92% geranyl acetate of commerce.

*Example 2*

Four hundred parts of a commercial beta-pinene pyrolysate consisting of about 60% myrcene and 40% limonene in 400 parts of chloroform was treated with hydrogen bromide gas at 10–15° C. until the weight increase was 158 parts. The solvent was removed in vacuo to a pot temperature of 50° C. at 50 mm. This product was distilled at reduced pressure through a short, packed column. A fore-run totaling 200 parts was discarded and the main fraction totaling 250 parts was taken at a boiling point of 103–112° C. at 21 mm. This product contained 29.9% bromine by analysis. Two hundred and seventeen parts of this product was added to a slurry of 100 parts anhydrous sodium acetate in 500 parts glacial acetic acid at 45° C. The resulting solution was heated to 50–60° C., and a slightly exothermic reaction began. After three hours the temperature was increased to 80° C. for an additional two hours and the mixture was quenched with dilute aqueous sodium chloride solution as in Example 1. The recovered oil was distilled through a short, packed column at 1–2 mm. One hundred and sixteen parts of a hydrocarbon fore-run and 39 parts of a fraction (B. P. 80–85° C./1–2 mm.) consisting primarily of geranyl acetate was recovered.

Example 3

Four hundred parts of beta-pinene pyrolysate containing about 60% myrcene and 40% limonene and 0.01% phenyl alpha naphthylamine in 100 cc. of chloroform was cooled to 10° C. and dry hydrogen chloride was added until the weight increase was 80 parts. The chloroform was removed in vacuo leaving 480 parts of the hydrochloride which was appreciably more stable than the hydrobromide. Half of this product was added to a warm solution of 120 parts of anhydrous sodium acetate in 480 parts glacial acetic acid. The solution was refluxed for two hours, during which time sodium chloride precipitated, and was quenched with aqueous sodium chloride solution. The recovered oil totaled 220 parts. Distillation at 2 mm. pressure gave 44 parts of product consisting principally of geranyl acetate but which included a small proportion of at least one other product with a sweet, fruity odor. Distillation of the other half of the original hydrochloride gave 101 parts of a material boiling at 97–107° C. at 24 mm. which consisted principally of a monohydrochloride.

Example 4

Four hundred parts of beta-pinene pyrolysate (approximately 60% myrcene and 40% limonene, containing 0.25% phenyl alpha naphthylamine) in an equal weight of glacial acetic acid was hydrochlorinated with anhydrous hydrogen chloride at 15–20° C. until the weight increase was 60 parts. The mixture was then added to 200 parts of sodium acetate trihydrate in 500 parts of glacial acetic acid at 90° C. After two hours at reflux, the mixture was quenched with 12% aqueous sodium chloride solution giving 425 parts of oil. Distillation at 61–85° C./3 mm. of 100 parts of this oil gave 19.5 parts of product having a refractive index range of 1.4701 to 1.4643 at 20° C. The first part of this fraction had a sweet pineapple-like odor; the latter half had the odor of geranyl and neryl acetates. The balance of the 100 parts of oil (80.5 parts) represented hydrocarbon forerun and distillation residue and was discarded. The balance of the 425 parts of oil (325 parts) was used in another experiment not recorded here.

Example 5

Fifty-eight parts of a commercial beta-pinene pyrolysate such as was used in Example 2 with no solvent present was treated with anhydrous hydrogen chloride in a closed system at temperatures of 30–35° C. and pressures up to 5 p. s. i. until 16.5 parts of the acid had been added. To this reaction product was added 42 parts of solid, substantially anhydrous sodium acetate. The slurry temperature was raised to 118–122° C. for four hours and finally quenched with aqueous sodium chloride solution. The recovered oil totaled 64 parts. Distillation of this product at reduced pressure through a Vigreaux column yielded 37 parts of hydrocarbon fore-run (saponification value less than 2 mg. of KOH per gram of sample), 8 parts of product consisting principally of linalyl acetate, and 13 parts of product consisting principally of geranyl and neryl acetates and a residue totalling 6 parts.

Example 6

A solution of 197 parts of myrcene (99% pure containing 0.25% p-t-butylcatechol) in 157 parts of glacial acetic acid was treated with dry hydrogen chloride at 10±5° C. until the weight increase was 54 parts. The solution was divided into two equal parts and both portions were quenched with 12% aqueous sodium chloride solution; the oils separated and dried over magnesium sulfate. Each product weighed 120 g. which is close to theory for the monohydrochloride.

One portion was distilled through a 5 foot Vigreaux column at 1–2 mm. pressure and two gram fractions were taken. The fore-run and residue were discarded and the fractions were bulked and analyzed as follows:

| Fractions | BP/1–2 mm. | $N_4 22°$ C. | Percent Cl |
|---|---|---|---|
| 6–10 | 56 | 1.4695 | 19.4 |
| 11–16 | 56–7 | 1.4770 | 19.9 |
| 17–20 | 56–9 | 1.4710 | 19.3 |
| 21–27 | 59–64 | 1.4750 | 20.0 |
| 28–32 | 64–66 | 1.4807 | 20.6 |
| 33–38 | 70–79 | 1.4770 | 23.2 |
| 39–43 | 81–89 | 1.4740 | 30.0 |

Theoretical Cl content of myrcene hydrochloride is 20.5%. The 28–32 sample is nearest to theory. The earlier samples are principally the monohydrochloride, but Cl content is low due to ease of dehydrochlorination. The differences in refractive index may represent different proportions of isomers. The last sample contains some dihydrochloride. The second portion of the hydrochloride was hydrolyzed with sodium acetate following the procedure of Example 3. Distillation gave 34 parts of a product which was predominately geranyl acetate.

Having thus described our invention, what we claim and desire to protect by Letters Patent is:

1. In a process of making a lower fatty acid ester of a nonadiene carbinol selected from the group consisting of geraniol, nerol and linalool wherein a halide selected from the group consisting of geranyl, neryl and linalyl chlorides and bromides is heated with an alkali metal salt of a lower fatty acid at an elevated temperature whereby the fatty acid acyloxy group is caused to replace the halogen, the step which comprises making said halide by treating myrcene with a substantially anhydrous hydrogen halide selected from the group consisting of hydrogen chloride and hydrogen bromide at a temperature of from 0° to 50° C. and thereby effecting preferential addition reaction of said hydrogen halide with said myrcene at only one double bond located in the conjugated diene portion of the myrcene, the amount of said hydrogen halide combining with said myrcene ranging from 0.75 to 1.25 mols per mol of myrcene.

2. In a process of making an acetic acid ester of a nonadiene carbinol selected from the group consisting of geraniol, nerol and linalool wherein a halide selected from the group consisting of geranyl, neryl and linalyl chlorides and bromides is heated with an alkali metal acetate at an elevated temperature whereby the acetoxy group is caused to replace the halogen, the step which comprises making said halide by treating myrcene with a substantially anhydrous hydrogen halide selected from the group consisting of hydrogen chloride and hydrogen bromide at a temperature of from 0° to 50° C. and thereby effecting preferential addition reaction of said hydrogen halide with said myrcene at only one double bond located in the conjugated diene portion of the myrcene, the amount of said hydrogen halide combining with said myrcene ranging from 0.75 to 1.25 mols per mol of myrcene.

3. In a process of making geranyl acetate wherein a halide selected from the group consisting of geranyl chloride and bromide is heated with an alkali metal acetate at an elevated temperature whereby the acetoxy group is caused to replace the halogen, the step which comprises making said halide by treating myrcene with a substantially anhydrous hydrogen halide selected from the group consisting of hydrogen chloride and hydrogen bromide at a temperature of from 0° to 50° C. and thereby effecting preferential addition reaction of said hydrogen halide with said myrcene at only one double bond located in the conjugated diene portion of the myrcene, the amount of said hydrogen halide combining with said myrcene ranging from 0.75 to 1.25 mols per mol of myrcene.

4. In a process of making a lower fatty acid ester of a nonadiene carbinol selected from the group consisting of geraniol, nerol and linalool wherein a halide selected from the group consisting of geranyl, neryl and linalyl chlorides and bromides is heated under refluxing conditions with an alkali metal salt of a lower fatty acid and with acetic acid as a solvent medium for said halide and said salt whereby the fatty acid acyloxy group is caused to replace the halogen, the step which comprises making said halide by treating myrcene with a substantially anhydrous hydrogen halide selected from the group consisting of hydrogen chloride and hydrogen bromide at a temperature from 0° to 50° C. and thereby effecting preferential addition reaction of said hydrogen halide with said myrcene at only one double bond located in the conjugated diene portion of the myrcene, the amount of said hydrogen halide combining with said myrcene ranging from 0.75 to 1.25 mols per mol of myrcene.

5. In a process of making a lower fatty acid ester of a nonadiene carbinol selected from the group consisting of geraniol, nerol and linalool wherein a halide selected from the group consisting of geranyl, neryl and linalyl chlorides and bromides is heated with an alkali metal salt of a lower fatty acid in solid, finely divided form at an elevated temperature whereby the fatty acid acyloxy group is caused to replace the halogen, the step which comprises making said halide by treating myrcene with a substantially anhydrous hydrogen halide selected from the group consisting of hydrogen chloride and hydrogen bromide at a temperature of from 0° to 50° C. and thereby effecting preferential addition reaction of said hydrogen halide with said myrcene at only one double bond located in the conjugated diene portion of the myrcene, the amount of said hydrogen halide combining with said myrcene ranging from 0.75 to 1.25 mols per mol of myrcene.

6. In a process of making a mixture of the acetic acid esters of geraniol, nerol and linalool wherein a halide selected from the group consisting of geranyl, neryl and linalyl chlorides is heated with solid, substantially anhydrous sodium acetate in the form of a slurry in said chloride at a temperature ranging from 75° to 130° C. whereby the acetoxy group is caused to replace the halogen, the step which comprises making said chloride by treating a beta-pinene pyrolysate comprising myrcene and limonene with anhydrous hydrogen chloride in the absence of a solvent at a temperature of from 0° to 50° C. and thereby effecting preferential addition reaction of said hydrogen chloride with said myrcene at only one double bond located in the conjugated diene portion of the myrcene, the amount of said hydrogen chloride combining with said myrcene ranging from 0.75 to 1.25 mols per mol of myrcene.

ROBERT L. KNAPP.
DWIGHT L. SCHOENE.

REFERENCES CITED

The following references are of record in the file of this patent:

UNITED STATES PATENTS

| Number | Name | Date |
|---|---|---|
| 1,426,036 | Brooks | Aug. 15, 1922 |
| 2,293,775 | Soday | Aug. 25, 1942 |
| 2,467,330 | Milas | Apr. 12, 1949 |

OTHER REFERENCES

Prevost: Annales de Chemie (10th series), vol. 10, pp. 166–168 (1928).

Beilstein: "Handbuch der organischen Chemie" (4th edition), vol. 1 (1st supplement), page 123 (1928).

Beilstein: Vol. 2 (second supplement), page 153 (1942).

Guenther: "The Essential Oils," vol. II (D. Van Nostrand Co., New York, 1949), pages 778 and 779.